United States Patent
Mauder et al.

(10) Patent No.: US 10,471,940 B2
(45) Date of Patent: Nov. 12, 2019

(54) COMPRESSED AIR BRAKE DEVICE FOR A RAIL VEHICLE WITH A DIRECT ELECTROPNEUMATIC BRAKE

(71) Applicant: SIEMENS MOBILITY GMBH, Munich (DE)

(72) Inventors: Mike Mauder, Dessau-Rosslau (DE); Stefan Reinicke, Ilmmuenster (DE); Manfred Wiesand, Burgthann (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/778,725

(22) PCT Filed: Nov. 29, 2016

(86) PCT No.: PCT/EP2016/079084
§ 371 (c)(1),
(2) Date: May 24, 2018

(87) PCT Pub. No.: WO2017/093224
PCT Pub. Date: Jun. 8, 2017

(65) Prior Publication Data
US 2018/0354479 A1   Dec. 13, 2018

(30) Foreign Application Priority Data

Dec. 4, 2015 (DE) .................. 10 2015 224 371

(51) Int. Cl.
*B60T 13/66* (2006.01)
*B60T 8/18* (2006.01)
(Continued)

(52) U.S. Cl.
CPC .......... *B60T 8/1893* (2013.01); *B60T 8/1705* (2013.01); *B60T 13/665* (2013.01); *B60T 13/683* (2013.01);
(Continued)

(58) Field of Classification Search
CPC ...... B60T 13/66; B60T 13/665; B60T 13/683; B60T 8/18; B60T 8/1893; B60T 17/228
(Continued)

(56) References Cited

U.S. PATENT DOCUMENTS 3,924,902 A * 12/1975 Engle ............... B60L 3/108
                                                303/132
4,538,228 A * 8/1985 Brearey ............ B60T 8/1705
                                                303/122.09
(Continued)

FOREIGN PATENT DOCUMENTS

DE    19510755 C2    9/1998
DE    60200340 T2    3/2005
(Continued)

*Primary Examiner* — Christopher P Schwartz
(74) *Attorney, Agent, or Firm* — Laurence Greenberg; Werner Stemer; Ralph Locher

(57) ABSTRACT

A compressed air brake device for a rail vehicle with a direct, electropneumatic brake has a brake control unit which has a brake control device with connected brake actuators and a brake pilot control pressure sensor connected to the brake actuators. An independent monitoring control unit is arranged in parallel to the brake control unit. The monitoring control unit has a monitoring control device with connected monitoring actuators and a monitoring pilot control pressure sensor. A monitoring pilot control pressure at the output of the monitoring actuators is closed-loop controlled using the monitoring pilot control pressure sensor. The higher pressure of a brake pilot control pressure and the monitoring pilot control pressure or, in the case of a fault of the brake control unit, the monitoring pilot control pressure can be relayed to the brake cylinder.

8 Claims, 1 Drawing Sheet

(51) Int. Cl.
*B60T 17/22* (2006.01)
*B60T 8/17* (2006.01)
*B60T 13/68* (2006.01)
*B60T 13/58* (2006.01)

(52) U.S. Cl.
CPC ........... *B60T 17/228* (2013.01); *B60T 13/586* (2013.01); *B60T 13/662* (2013.01)

(58) Field of Classification Search
USPC ........................................ 303/127, 128, 131
See application file for complete search history.

(56) References Cited

U.S. PATENT DOCUMENTS

| | | | |
|---|---|---|---|
| 5,927,823 A * | 7/1999 | Dimsa | B60T 13/665 303/15 |
| 6,520,599 B2 | 2/2003 | Wood et al. | |
| 6,709,069 B2 * | 3/2004 | Riddiford | B60T 13/662 188/1.11 R |
| 9,067,572 B2 | 6/2015 | Lichterfeld et al. | |
| 9,352,736 B2 * | 5/2016 | Mayer | B60T 13/665 |
| 9,545,907 B2 | 1/2017 | Rasel et al. | |
| 9,669,818 B2 | 6/2017 | Kull et al. | |
| 2015/0166033 A1 * | 6/2015 | Kull | B60T 17/228 303/3 |

FOREIGN PATENT DOCUMENTS

| | | |
|---|---|---|
| DE | 102009051019 A1 | 5/2011 |
| DE | 102012202120 A1 | 8/2013 |
| DE | 102012009427 A1 | 11/2013 |
| DE | 102012013521 A1 | 1/2014 |
| RU | 40042 U1 | 8/2004 |
| WO | 2004080775 A1 | 9/2004 |
| WO | 2011086029 A2 | 7/2011 |

* cited by examiner

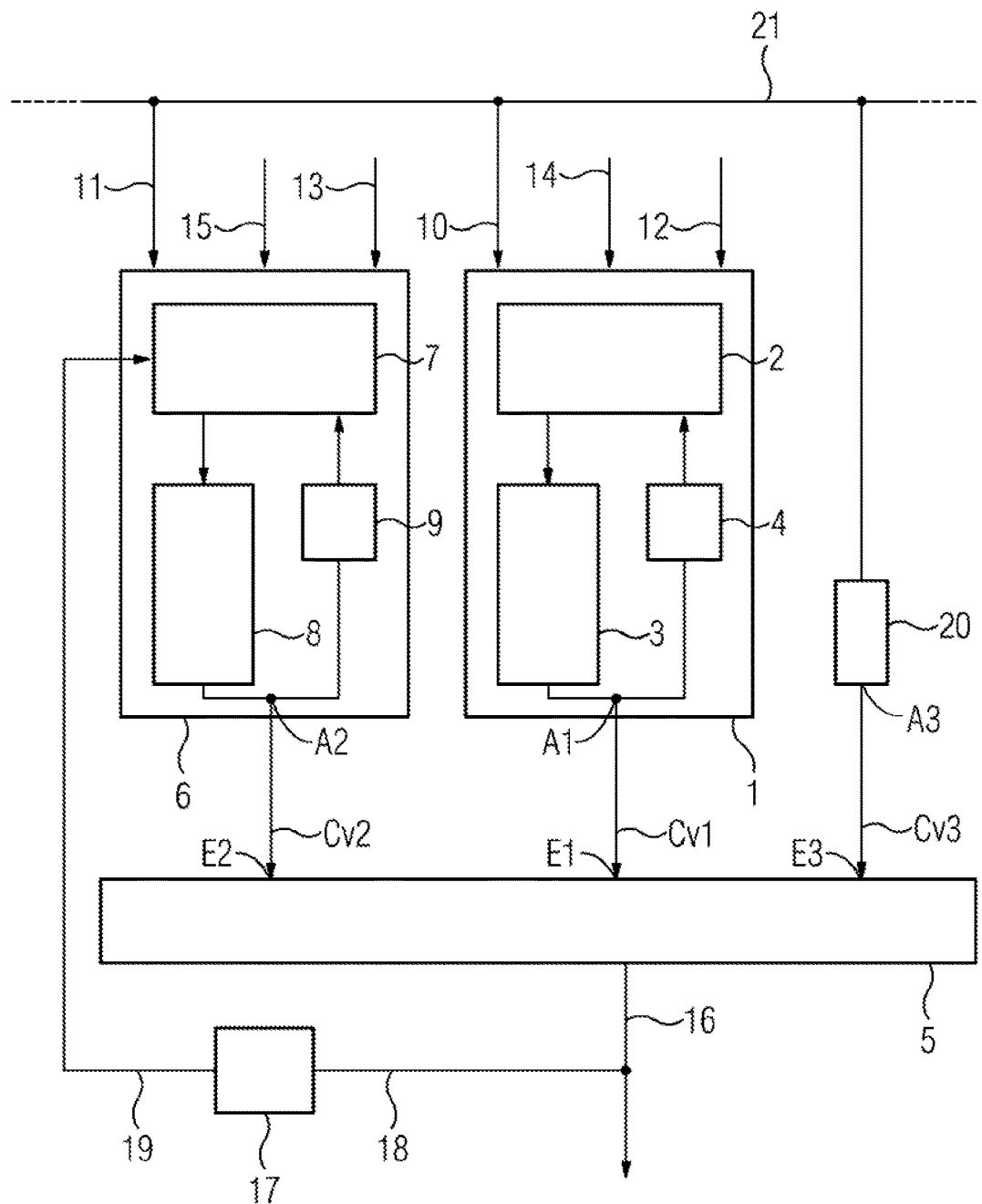

COMPRESSED AIR BRAKE DEVICE FOR A RAIL VEHICLE WITH A DIRECT ELECTROPNEUMATIC BRAKE

BACKGROUND OF THE INVENTION

Field of the Invention

The invention relates to a compressed, air brake device for a rail vehicle with a direct electropneumatic brake with a brake control unit which has a brake control device with connected brake actuators and a brake pilot control pressure sensor which is connected to the brake actuators, and with a pressure converter which is loaded with a brake pilot control pressure by the brake actuators and is connected to a downstream brake cylinder.

A compressed air brake device of this type is disclosed in the unexamined German patent application DE 10 2012 013 521 A1. In the case of this known compressed air brake device, a brake control unit is equipped with a brake control device to which brake actuators are connected in the form of a brake solenoid valve and a release solenoid valve. A pressure sensor is connected to the known brake actuators. Downstream of the brake actuators in the known compressed air brake device is a pressure converter, which is loaded with a brake pilot control pressure that can be set by the brake actuators. Brake cylinders are connected to the pressure converter. The known method is used to detect leakages in a brake pressure line which carries a brake pressure within a rail vehicle.

SUMMARY OF THE INVENTION

The object of the invention is to propose a compressed air brake device for a rail vehicle with a direct electro-pneumatic brake, with improved braking characteristics and greater safety, particularly in the case of quick-action braking.

This object is achieved for a compressed air brake device of the type cited in the introduction by inventively arranging an independent monitoring control unit in parallel with the brake control unit, said monitoring control unit having a monitoring control device with connected monitoring actuators and a monitoring pilot control pressure sensor which is connected to the monitoring actuators. A monitoring pilot control pressure at the output of the monitoring actuators can be regulated using the monitoring pilot control pressure sensor, wherein in each case the higher pressure from the brake pilot control pressure and the monitoring pilot control pressure, or the monitoring pilot control pressure if the brake control unit is functioning incorrectly, can be relayed to the brake cylinder. The pressure converter is connected to the input of a pressure sensor, while the output of the pressure sensor is connected to the monitoring control device.

The German patent specification DE 195 10 755 C 2 discloses a brake arrangement for a rail-bound traction unit having a plurality of brake systems and an emergency brake monitoring system, in which a deceleration value in a longitudinal vehicle direction is captured by means of a braking effect capture stage and forwarded to a braking force monitoring stage, wherein operating commands from this stage are used to activate the brake systems of the vehicle, but the deceleration value of this known brake arrangement is captured at a central point of the traction unit, and decentralized brake actuators are activated on this basis in the case of emergency/quick-action braking. It is however not possible with the known brake arrangement to establish which decentralized brake systems of the traction unit are producing too little braking force.

It is considered a significant advantage of the inventive compressed air brake device that, by means of an independent monitoring control unit which interacts with a brake control unit, it is possible in each case to establish which decentralized brake systems in a rail vehicle are producing too little braking force in an ill-timed manner, and largely to compensate for this. By virtue of the inventive compressed air brake device, it is possible specifically to ensure that adhesion coefficient limits can be individually respected at specific wheelsets of the rail vehicle, because speed-dependent reliable adhesion coefficient limits can be predetermined and consequently respected by means of the monitoring control device. It is important for the invention specifically that the monitoring control unit works independently of the brake control unit, since the monitoring control unit, can have brake characteristics which are stored electronically, for example. It is possible in this way to proceed such that, by means of a pressure sensor at the pressure converter, the higher pressure from the brake pilot control pressure and the monitoring pilot control pressure can be relayed to the brake cylinder or, if the brake control unit is functioning incorrectly, the monitoring pilot control pressure at the pressure converter is relayed to act on the brake cylinder.

Incorrect functioning of the brake control unit can be identified by means of self-diagnosis. It is however also possible to infer a fault of the brake control unit by means of the pressure sensor connected at the output of the pressure converter, using a diagnostic routine in the monitoring control unit and with knowledge of the transformation ratio of the pressure converter. In this case, as an alternative to a maximum selection, provision could also be made for controlled switching of the pressure converter in respect of the brake pilot control pressure to the monitoring pilot control pressure.

The regulated activation of the inventive compressed air brake device allows a maximum possible braking force to be generated, because the influence of stages where brake characteristics are stored in the brake control device is limited. If a further brake system is present in addition to the inventive compressed air brake device, the dependency on the braking power of this brake system is likewise low. Furthermore, when using brake systems which act on the same wheelsets, e.g. electrodynamic brakes or hydraulic retarders, it is possible to apply maximum possible braking forces while utilizing the permissible adhesion coefficient limits, particularly in the case of quick-action braking. Wear-minimizing brake systems no longer need to be limited as a function of speed.

Using the inventive compressed air brake device, an electrical monitoring signal which is formed by the monitoring brake control device can be formed in different ways. It is considered advantageous to store brake characteristics in the brake control device and in the monitoring brake control device.

At the same time, it is also possible and possibly advantageous for the brake control device and the monitoring control device to be loaded with a signal as a function of the braking power of a further brake (e.g. electrical brake or retarder) of the rail vehicle, by means of which signal the required pneumatic braking force can be regulated as a function of the braking force/power of this additional brake.

In each case, the brake characteristics and/or the signal that is formed as a function of the braking power of a further electrical brake of the rail vehicle provide the brake control device and monitoring control device with a specification for the braking characteristics.

In a further advantageous development, the brake control unit and the monitoring control unit, in particular the brake control device and the monitoring control device, are embodied in a diversely redundant manner.

The inventive compressed air brake device can be utilized in different ways; in particular it can be used as a quick-action brake but also as a redundant service brake, because the advantage of a parallel arrangement of a monitoring control unit and the brake control unit is similarly present in both application cases.

In a further advantageous development, a valve arrangement is attached to a quick-action braking loop of the compressed air brake device, from which valve arrangement the pressure converter can be loaded with a minimum pressure, which is lower than the brake pilot control pressure and the monitoring pilot control pressure.

In order explain the invention further, an exemplary embodiment of the inventive compressed air brake device with brake control device and monitoring control device is illustrated in the FIGURE.

BRIEF DESCRIPTION OF THE DRAWING

The sole FIGURE of the drawing is a schematic diagram illustrating the compressed air brake device according to the invention.

DESCRIPTION OF THE INVENTION

The FIGURE shows a brake control unit 1 for a compressed air brake device, with a brake control device 2 which is known per se and can be derived from the prior art cited in the introduction. Attached to the brake control device 2 are brake actuators 3, these being designed as a brake solenoid valve and a release solenoid valve, for example. A brake pilot control pressure sensor 4 is connected to the brake actuators 3 on its input side and to the brake control device 2 on its output side.

The illustrated brake control unit 1 is configured to generate at its output A1 a pilot control pressure Cv1 which, in the illustrated exemplary embodiment, loads a pressure converter 5 with maximum selection at a first control input E1.

In the illustrated exemplary embodiment, a monitoring control unit 6 is provided in parallel with and independently of the brake control unit 1, and contains a monitoring control device 7 to which the monitoring actuators 8 are connected. Connected to the monitoring actuators 8 is a monitoring pilot control pressure sensor 9 which is connected on its output side to the monitoring control device 7 in a manner which forms a regulating circuit. To this extent, the structure of the monitoring control unit 6 is very similar to that of the brake control device 1. On the output side at the output A2, the monitoring control unit 6 forms a monitoring pilot control pressure Cv2 which loads the pressure converter 5 with maximum selection at a second control input E2.

Both the brake control unit 1 and the monitoring control unit 6 can be loaded on possibly corresponding signal paths 10 and 11 for the purpose of capturing a braking request. A signal path in this case may comprise control technology in the rail vehicle, a drop of the pressure in a main airline of the rail vehicle to a quick-action braking level, a safety loop in the rail vehicle or a control line.

In addition, a signal representing a measure for the current speed of the rail vehicle is input via a signal path 12 or 13. The speed is therefore important for ensuring that respective speed-dependent maximum permissible adhesion coefficient limit values are not exceeded and/or for limiting the speed-dependent mechanical power input into the braking mechanism. It is also possible to arrange speed sensors in the signal path 12 or 13, by means of which the speed of the rail vehicle is determined.

In addition, both the brake control unit 1 and the monitoring control unit 6 each have a respective signal input 14 and 15, via which brake characteristics are passed or the required pneumatic braking force is transferred as a function of the braking power of a further brake system such as an electrodynamic brake, for example. Alternatively, the brake characteristics can also be stored directly in the control units and/or the current actual values of the power of an electrodynamic brake can be transferred via the signal inputs 14 and 15, for example. The characteristics can be speed-dependent.

An output line 16 at the pressure converter 5 leads to a brake cylinder (not illustrated). The output line 16 connects to the input 18 of a pressure sensor 17, whose output 19 is connected to the monitoring control device 7. By means of this connection, it is possible to monitor that the correct and in each case higher pressure from the brake pilot control pressure Cv1 and the monitoring pilot control pressure Cv2 is switched to the brake cylinder. In this embodiment variant of the inventive compressed air brake device, the higher of the two pressures is therefore output to the brake cylinder. However, in the case of incorrect functioning of the brake control unit 1, the monitoring pilot control pressure can be switched and relayed to the brake cylinder.

The illustrated compressed air brake device is also equipped with a valve arrangement 20 which is connected on one side to a partially shown quick-action braking loop 21 and on the other side to the pressure converter 5. The valve arrangement 20, whose output A3 is connected to a third control input E3 of the pressure converter 5, provides a minimum pressure Cv3 at the pressure converter 5, which is lower than the brake pilot control pressure Cv1 and the monitoring pilot control pressure Cv2. The minimum pressure Cv3 can be set independently of the cited pilot control pressures. In this case, the minimum pressure Cv3 for generating an emergency braking force is selected such that if a fault is present in both the brake control unit 1 and in the monitoring control unit 6 due to the maximum selection of the pressure converter 5, the minimum pressure Cv3 is relayed to the brake cylinder.

The invention claimed is:

1. A compressed air brake device for a rail vehicle with a direct electropneumatic brake, the device comprising:
    a brake control unit having a brake control device with connected brake actuators and a brake pilot control pressure sensor connected to the brake actuators;
    a pressure converter that is loaded with a brake pilot control pressure by the brake actuators and is connected to at least one downstream brake cylinder;
    an independent monitoring control unit connected in parallel with said brake control unit, said monitoring control unit having a monitoring control device with connected monitoring actuators and a monitoring pilot control pressure sensor connected to the monitoring actuators;
    said monitoring pilot control pressure sensor controlling a monitoring pilot control pressure at an output of said monitoring actuators, wherein in each case a higher pressure of the brake pilot control pressure and the monitoring pilot control pressure, or, if a fault is present in said brake control unit, the monitoring pilot control pressure, is relayed to the brake cylinder; and a pressure sensor having an input connected to said pressure converter and an output connected to said monitoring control device of said monitoring control unit.

2. The compressed air brake device according to claim 1, wherein said brake control device and said monitoring brake control device are configured to store brake characteristics.

3. The compressed air brake device according to claim 1, wherein said brake control device and said monitoring control device are loaded with a signal as a function of a braking power of a further electrical brake of the rail vehicle, wherein the signal controls a required pneumatic braking force.

4. The compressed air brake device according to claim 1, wherein said brake control unit and said monitoring control unit are embodied in diverse implementation.

5. The compressed air brake device according to claim 1, wherein said brake control device and said monitoring control device are embodied in diverse implementation.

6. The compressed air brake device according to claim 1 configured as a quick-action brake.

7. The compressed air brake device according to claim 1 configured as a service brake.

8. The compressed air brake device according to claim 1, which comprises a quick-action braking loop and a valve arrangement connected to said quick-action braking loop, said valve arrangement being connected to load said pressure converter with a minimum pressure, which is lower than the brake pilot control pressure and the monitoring pilot control pressure.

* * * * *